United States Patent [19]

Nilsson

[11] Patent Number: 4,745,941

[45] Date of Patent: May 24, 1988

[54] VALVE SYSTEM FOR OXYGEN ENRICHMENT OF A FLOW OF PRESSURIZED COMBUSTION AIR

[75] Inventor: Leif Nilsson, Lidingo, Sweden

[73] Assignee: AGA Aktiebolag, Sweden

[21] Appl. No.: 932,915

[22] Filed: Nov. 19, 1986

[30] Foreign Application Priority Data

Nov. 22, 1985 [SE] Sweden .................................. 8505515

[51] Int. Cl.⁴ ...................... G05D 11/03; F16K 3/30; F16K 31/365
[52] U.S. Cl. .................................. 137/114; 137/625.3
[58] Field of Search ...................... 137/98, 114, 625.3, 137/625.33, 508

[56] References Cited

U.S. PATENT DOCUMENTS

| | | | |
|---|---|---|---|
| 1,255,538 | 2/1918 | Kitton | 137/98 |
| 2,637,985 | 5/1953 | Ray | 137/625.3 |
| 2,642,254 | 6/1953 | Armstrong | 137/625.3 X |
| 3,212,526 | 10/1965 | Williams et al. | 137/625.41 |
| 3,429,326 | 2/1969 | Arnell et al. | 137/98 |
| 4,228,958 | 10/1980 | Perry | 137/114 X |
| 4,244,388 | 1/1981 | Feiss | 137/625.3 X |

FOREIGN PATENT DOCUMENTS

| | | |
|---|---|---|
| 1913859 | 3/1969 | Fed. Rep. of Germany . |
| 2239507 | 8/1972 | Fed. Rep. of Germany . |
| 2243386 | 9/1972 | Fed. Rep. of Germany . |

OTHER PUBLICATIONS

North American Combustion Handbook, pp. 277-281.

Industrial Combustion Data, by Hauck, pp. 119-121.

Primary Examiner—Martin P. Schwadron
Assistant Examiner—Stephen M. Hepperle
Attorney, Agent, or Firm—David A. Burge

[57] ABSTRACT

A valve system is provided for enriching a flow of one gas with flow of another gas, with the mixing of the gas flows being conducted so as to maintain a constant ratio of the two gases in the resultant flow. The system of the present invention is particularly well suited for use in enriching a flow of pressurized combustion air with a flow of oxygen. A mixing valve is utilized that has a body which extends into a supply line through which combustion air is ducted under pressure to a burner. The mixing valve provides an injection location at the center of the combustion air supply line where relatively movable valving components are positioned for introducing oxygen into the flow of combustion air. The introduction of oxygen into the combustion air flow is regulated in accordance with the flow rate of the combustion air as it is sensed at the location of the mixing valve. The body of the mixing valve defines a chamber that is divided into segregated portions by a flexible diaphragm. Movement of the diaphragm within the chamber causes corresponding seating and opening movements of valve components. A feature of the present invention resides in its use of a diaphragm operated mixing valve that does not expose the diaphragm to the flow of oxygen that is to be regulated, and that provides a means for cutting off oxygen flow if the diaphragm should rupture.

10 Claims, 5 Drawing Sheets

VALVE SYSTEM FOR OXYGEN ENRICHMENT OF A FLOW OF PRESSURIZED COMBUSTION AIR

BACKGROUND OF THE INVENTION

1. Field of the Invention

The present invention relates to a gas mixing system for enriching a flow of one gas with flow of another gas, with the combination and mixing of the gas flows being conducted so as to maintain a relatively constant percentage of the two gases in the resultant flow. The system of the present invention is particularly well suited for use in enriching a flow of pressurized combustion air with a flow of oxygen.

2. Prior Art

It is known to supply flows of pressurized gaseous fuel and combustion air to a gaseous fuel burner, and to adjust the rates of flow of gaseous fuel and combustion air to effect an efficient burning of the fuel while generating a desired level of heat energy output. The heat energy output of the burner typically is controlled by regulating the flow rate at which gaseous fuel is delivered to the burner. The combustion efficiency of the burner typically is maximized by regulating the rate of flow of combustion air to the burner so that the ratio of gaseous fuel to combustion air that is delivered to the burner is within a desired range.

In conventional practice, a flow of so-called "combustion air" is provided by using a fan or blower to introduce a flow of ambient air into a supply line and to effect its flow through the supply line to the burner. A movable member called a "damper" is installed in the supply line to provide a means for adjustably controlling the rate of flow of the combustion air.

Proposals have been made to enhance the combustion efficiency of gaseous fuel burners by enriching their combustion air flows with oxygen. To the extent that such proposals have called for the use of membrane or diaphragm operated valving elements to control the relative flow rates of oxygen and combustion air that are delivered to a gaseous fuel burner, such proposals have characteristically suffered from a number of drawbacks. By way of example, many such proposals utilize membranes or diaphragms that are deployed such that, if ruptured, oxygen is permitted to flow where it should not. In some cases, a ruptured diaphragm can ermit oxygen to mix undesirably with another gas, generating a dangerously explosive mixture. In other cases, a ruptured diaphragm can permit oxygen to be ducted at an undesirably high rate of flow to a burner, causing damage and/or creating a danger.

A further drawback of many prior proposals resides in their failure to provide a means for properly controlling the flow rate of one gas to a mixing location in accordance with the flow rate of another gas to the mixing location. Still other drawbacks reside in the undue complexity of the valving components that have been proposed, their attendant cost, and/or the assembly and repair difficulties they present.

SUMMARY OF THE INVENTION

The present invention overcomes the foregoing and other drawbacks of the prior art by providing a novel and improved system for enriching a flow of one gas with a flow of another gas, with the flow rate of introduction of the enriching gas into the carrier gas being automatically adjusted in response to changes in the flow rate of the carrier gas so that the proportion of the enriching gas to carrier gas in the resulting mixed flow remains substantially constant.

The system of the present invention is particularly well adapted for use in effecting oxygen enrichment of a flow of pressurized combustion air. In preferred practice, a mixing valve is utilized that extends into a supply line through which combustion air is ducted under pressure to a burner. The mixing valve provides an injection location ror introducing oxygen into the flow of combustion air at a location that is within the central part of the combustion air flow path. The mixing valve regulates the introduction of oxygen into the combustion air in accordance witn the flow rate of the combustion air as it is sensed at the location of the mixing valve.

The mixing valve that is utilized in accordance with preferred practice has a body that defines a chamber. The chamber is divided into segragated portions by a flexible diaphragm. Movement of the diaphragm within the chamber causes corresponding seating and opening movements of valve components that are located on a portion of the body which projects centrally into the combustion air supply line for ducting oxygen centrally into the flow of combustion air. One of the segregated chamber portions communicates with the combustion air supply line, thereby exposing one side of the diaphragm to the pressure of the combustion air flow. The other of the segregated chamber portions communicates with the atmosphere and houses a compression coil spring that (together with atmospheric pressure of ambient air operating on the diaphragm) biases the diaphragm in opposition to he biasing action of the pressure of the combustion air supply line acting on the diaphragm, whereby the spring and atmospheric pressure are used to bias the relatively movable parts of the valve toward their "closed" position. By this arrangement, if the diaphragm should rupture, air would be permitted to mix with air, but oxygen flow would be cut off by the action of the compression coil spring seating the valving elements that control the flow of oxygen. Stated in another way, a feature of the present invention resides in its use of a diaphragm operated mixing valve that does not expose the diaphragm to the flow of oxygen that is to be regulated, and that provides a means for cutting off oxygen flow if the diaphragm should rupture.

A feature of the mixing valve resides in its sensitivity to changes in flow rate of the combustion air within the supply line. As is well known to those skilled in the art, a change in rate of flow of a gas within a supply line will produce a corresponding change in the line pressure; indeed, as the rate of flow of a gas in a supply line changes, the pressure of the gas in the supply line changes quadratically in proportion, i.e., in proportion to the square of the change in flow rate. Thus, for example, if the flow rate of a gas in a supply line is cut in half, the line the pressure will be reduced to one quarter. Although the p.essure at which combustion air is ducted to a gaseous fuel burner is quite low (i.e., typically less than 1 psig, with maximum pressures typically being within the range of about +700 mm water column to about +2000 mm water column), the pressure at which combustion air travels through a supply line can be monitored to provide a very sensitive indication of a change in flow rate. Because the mixing valve of the present invention relies on detected pressure changes in the flow of combustion air to sense changes in flow rate, and because pressure changes vary with the square of the magnitude of the flow rate, the mixing valve of the present invention responds in a very sensitive manner to changes in flow rate of the combustion air.

A further feature of the present invention resides in its provision of a gas mixing valve that serves to maintain a constant percentage of oxygen in the resulting mixed flow, with the oxygen content of the mixed flow being selectively adjustably within a range of about 25 percent to about 100 percent, independent of the pressure of the combustion air flow.

In accordance with the most preferred practice of the present invention, a proportional mixing valve is provided for installation on a combustion air supply line for introducing a controlled flow of oxygen into a flow of combustion air, with the delivery of the oxygen into the combustion air being effected so as to maintain a relatively constant ratio of these gases in the resultant flow of mixed gases. The valve gas a housing or body that defines a chamber which is divided into separate portions by a membrane that is clamped by parts of the valve body. A spring member is provided on one side of the diaphragm and is housed within one of the separate chamber portions, which chamber portion also is veted to admit ambient air. At least one rod-shaped member is provided on the other side of the diaphragm, and extends through a duct that is formed in the valve body for connecting the diaphragm with a movable valving element. The movable valving element is a sleeve-like member that extends circumferentially about and is movable axially along a tubular body portion that projects centrally into the combustion air supply line. An oxygen delivery passage is formed through the body for communicating the tubular body portion with a source of pressurized oxygen. The tubular body portion defines an outlet formation for dispensing oxygen into the combustion air supply line, with the dispensing of oxygen into the combustion air supply line being controlled by the positioning of the movable sleeve-like valving element relative to the tubular body portion. The duct in which the rod-shaped member is disposed communicates at one end with the combustion air supply line, and at its other end with the valve chamber portion that is on the opposite side of the diaphragm from the spring member, whereby the duct serves not only to support the rod-shaped member for movement relative to the body but also to admit combustion air from the supply line into the valve chamber portion that is on the opposite side from the spring. By this arrangement, the greater the pressure of the flow of combustion air through the supply line, the greater will be the force of this pressure that acts on the diaphragm, whereby the diaphragm will move more extensively in opposition to the action of the biasing spring to increase the sizes of the oxygen outlet openings to thereby increase the rate of flow of oxygen that discharges into the combustion air flow.

In preferred practice, the sleeve-like member that serves as a valving element has a plurality of grooves that are brought into alignment with a body-carried oxygen discharge passage when the valve is "opened." Thus the mixing valve delivers oxygen into central portions of the flow of combustion air in a plurality of flows that extend substantially radially with respect to the tubular body portion of the sleeve, whereby a desirable type of mixing of the oxygen with the flow of combustion takes place.

DESCRIPTION OF THE PREFERRED EMBODIMENT

While the system of the present invention will be described in its preferred form as being utilized to enrich a flow of pressurized combustion air with oxygen, it will be understood by those skilled in the art that features of the invention can by utilized in effecting proportional mixing of gases other than air and oxygen.

Figure 1:
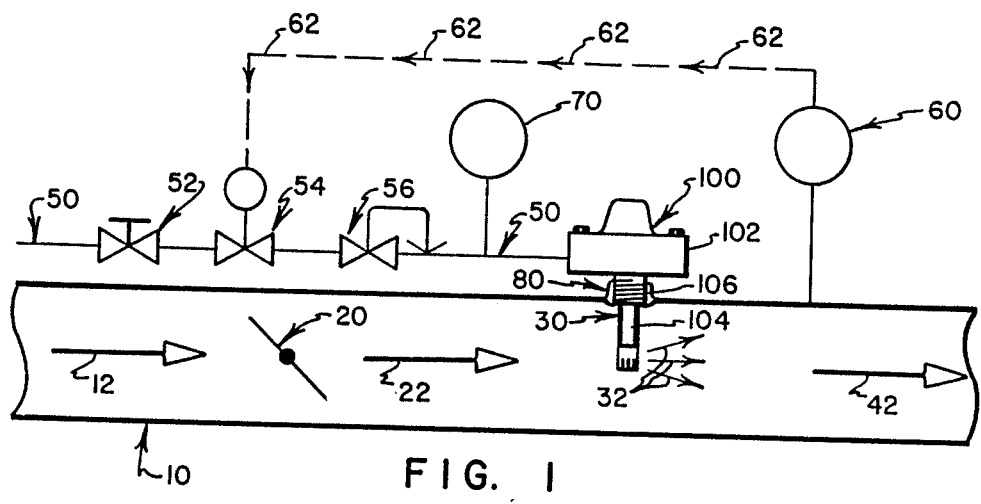
FIG. 1 is a schematic view of a system for proportionally mixing a flow of one gas with a flow of another gas, and embodying the preferred practice of the present invention.

Referring to FIG. 1 a supply line 10 is shown which is of the conventional type that is used to duct a pressurized flow of combustion air from a fan or blower (not shown) to a gaseous fuel burner (not shown). A flow of combustion air traveling through the supply line 10 from a source of pressurized combustion air is indicated by an arrow 12.

A relatively movable damper 20 is provided in the supply line 10 for adjustably controlling the rate of flow of combustion air through the supply line 10. A flow of combustion air through the supply line 10 that is regulated by the damper 20 is indicated generally by an arrow 22.

As will be explained in greater detail, a mixing valve 30 is connected to the supply line 10 and serves to introduce a regulated flow of oxygen centrally into the supply line 10. An introduced flow of oxygen from the mixing valve 30 is designated by arrows 32. Oxygen 32 that is introduced into the flow of combustion air 22 mixes with the combustion air flow to provide a flow of mixed gas that is designated by an arrow 42.

Oxygen is supplied to the mixing valve 30 through a supply line 50. The supply line 50 connects with a conventional source of pressurized oxygen (not shown) such as a pressurized gas cylinder or tank. A shutoff valve 52, a flow control valve 54, and a flow regulator 56, all of conventional design, are interposed in the supply line 50 to provide a controlled flow of oxygen to the mixing valve 30.

A pressure sensor 60 is provided for sensing pressure within the supply line 10 at a location downstream from the mixing valve 30, and for providing a signal, as indicated by arrows 62, to the flow control valve 54. The signal 62 causes the flow control valve 54 to open when a flow of pressurized combustion air is sensed in the supply line 10, and to close when an absence of flow is detected.

For convenience in monitoring and checking operation of the system, the sensor 60 also provides a gage 62 that is directly readable to provide an indication of the pressure in the supply line 10, and with a gage 70 that is directly readable to provide an indication of the pressure in the supply line 50.

In operation, the control valve 52 is opened to permit oxygen to flow through the supply line 50 to the valve 54. A flow of combustion air 12 is established through the supply line 10, and the damper 20 is adjusted to provide a desired flow 22. As the pressure sensor 60 detects a suitable pressure of combustion air flow within the supply line 10, the signal 62 from the sensor 60 causes the control valve 54 to open, whereby oxygen is delivered through the pressure regulator 56 to the mixing valve 30. The mixing valve 30 ducts oxygen at an appropriate rate of flow into the supply line 10, as is indicated by arrows 32, with the flow rate of oxygen into the supply line 10 being regulated in accordance with the rate of flow of combustion air 22 through the supply line 10. As will be explained, the rate of flow of combustion air 22 through the supply line 10 is sensed by the mixing valve 30 as a function of sensed pressure within the supply line 10, and the mixing valve 30 causes oxygen 32 to be introduced into the supply line 10 at flow rates that are coordinated with and proportional to the rates of flow of combustion air 22 through the line 10.

In the more detailed discussion that follows, various features of the mixing valve 30 (including the features of the components that form the body 100 and other elements of the mixing valve 30) are described using "position" and "orientation" incicator terms such as "upper," "lower," "upwardly" and "downwardly," etc. Despite the use of such terms, it will be understood by those skilled in the art that the orientation of the mixing valve 30 and the configuration and arrangement of its various components (as depicted in the drawings and described in the text) can be altered to suit the preferences of the designer and o accommodate the needs of a particular installation. Thus, the use of such terms herein as "upper" and "lower," "upwardly" and "downwardly," etc. is not to be interpreted as limiting (either with respect to the utility of the invention or the scope of the claims that follow).

Figure 4:
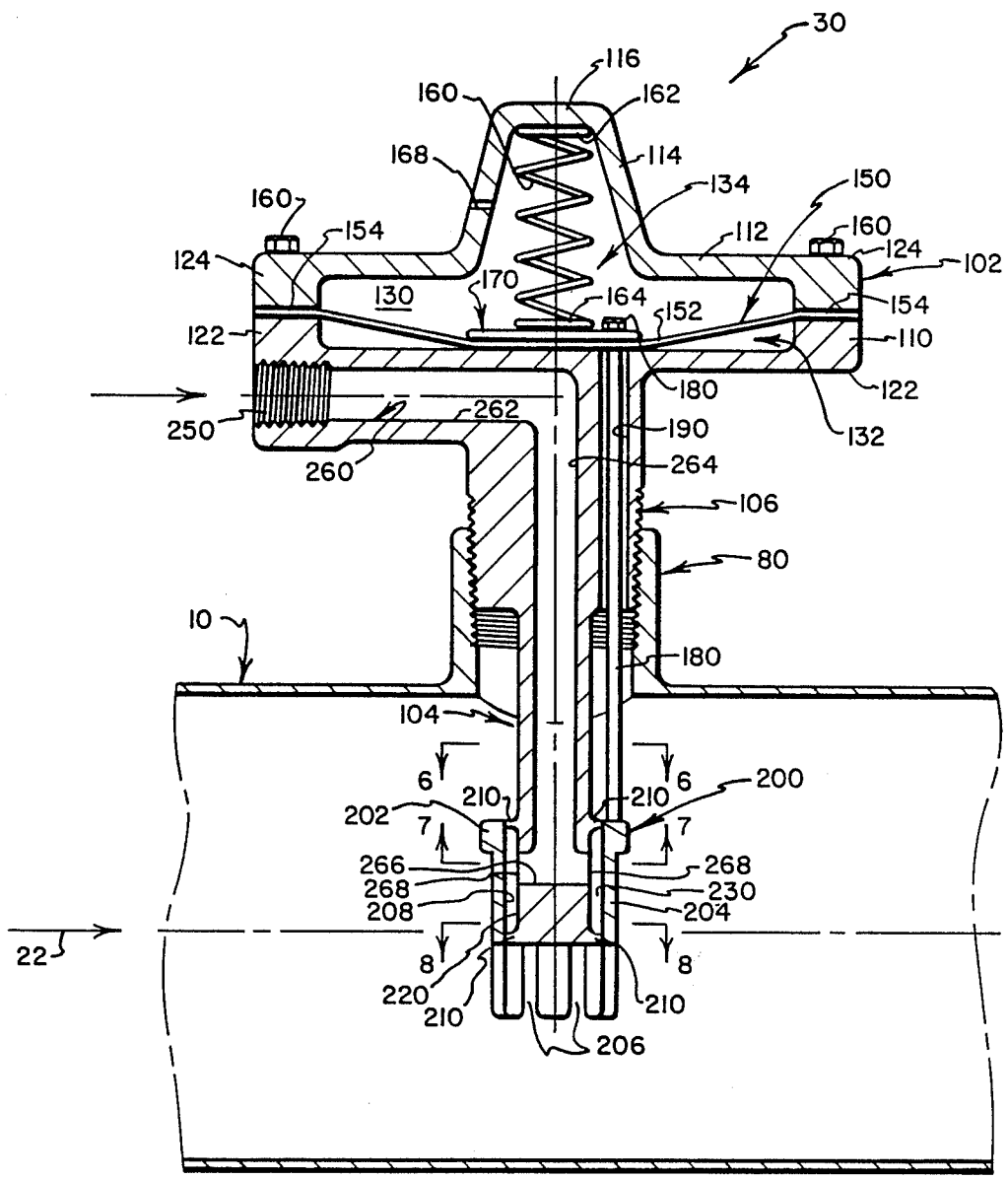
FIG. 4 is a sectional view as seen from a plane indicated by a line 4—4 in FIG. 3.

Referring to FIG. 4 in conjunction with FIG. 1, the mixing valve 30 has a housing or body that is designated generally by the numeral 100. The body 100 is an assembly that has a relatively large diameter portion 102 that is positioned exteriorly with respect to the supply line 10, a relatively small diameter, elongate, tubular portion 104 that extends interiorally with respect to the supply line 10, and a threaded central portion 106 that has a diameter which is intermediate in size to the diameters of the exterior and interior portions 102, 104. A threaded connector or "muff" 80 extends through a sidewall of the supply line 10 for mounting the mixing valve 30 on the supply line 10. The central portion 106 is threaded into the connector 80 and forms a gas-tight seal between the mixing valve body 100 and the supply line 10.

Figure 5:
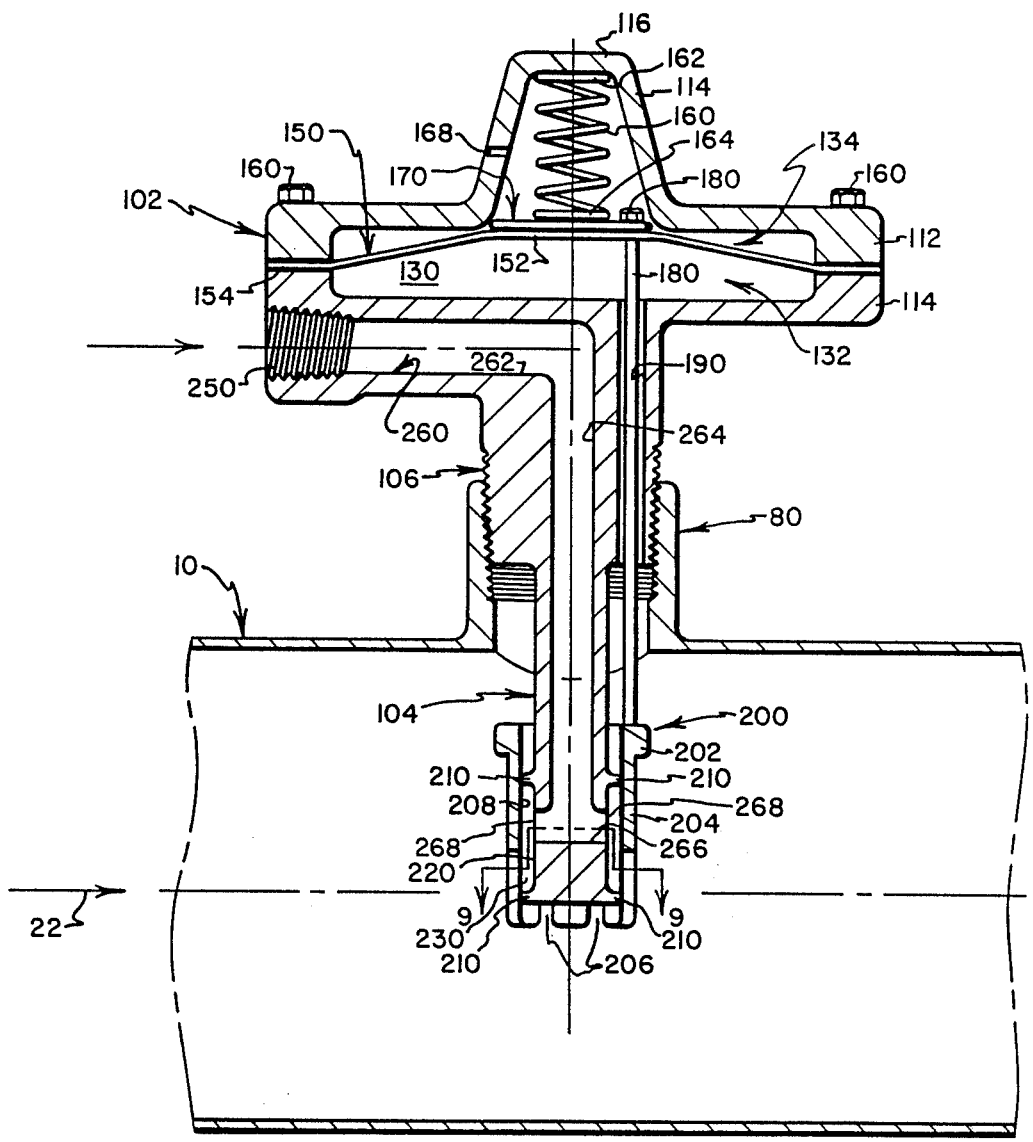
FIG. 5 is a sectional view similar to FIG. 4 but with valving components full open.

Referring to FIGS. 2-5, the mixing valve body 100 includes a pair of lower and upper housing members 110, 112, namely a base member 110 and a cap member 112. Referring to FIGS. 4 and 5, the base and cap members 110, 112 cooperate to define a chamber 130. The chamber 130 is located within the enlarged diameter exterior portion 102 of the body assembly 100 of the mixing valve 30, i.e., exteriorly with respect to the supply line 10.

A circular membrane or diaphragm 150 is interposed between the base and cap members 110, 112. The chamber 130 is divided into lower and upper portions 132, 134, respectively, by central portions 152 of the membrane 150 that extend through the chamber 130. The base and cap members 110, 112 have radially extending flange portions 122, 124, respectively, that underlie and overlie circumferentially extending edge portions 154 of the membrane 150. Threaded fastener 160 extend through aligned holes (not shown) that are formed in the flange portions 122, 124 and in the circumferent edge portions 154, and are tightened in place so that the flange portions 122, 124 tightly clamp the edge portions 154 to establish gas tight seals that segregate the lower and upper chamber regions 132, 134 from each other, and that prevent gas from leaking through the juncture of the flanges 122, 124.

Figure 2:
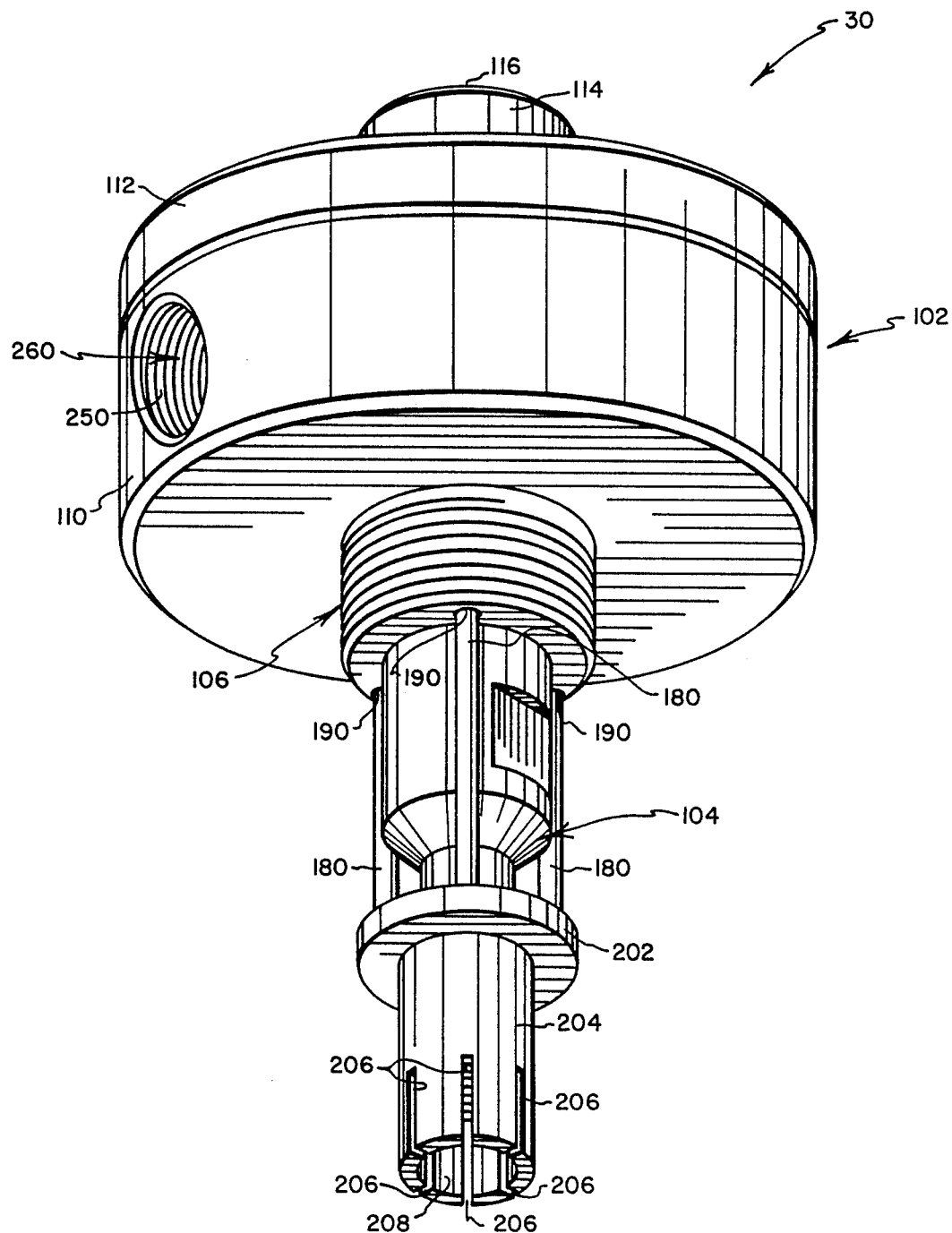
FIG. 2 is a perspective view, on an enlarged scale, of a mixing valve that embodies features of the system of the present invention.
Figure 3:
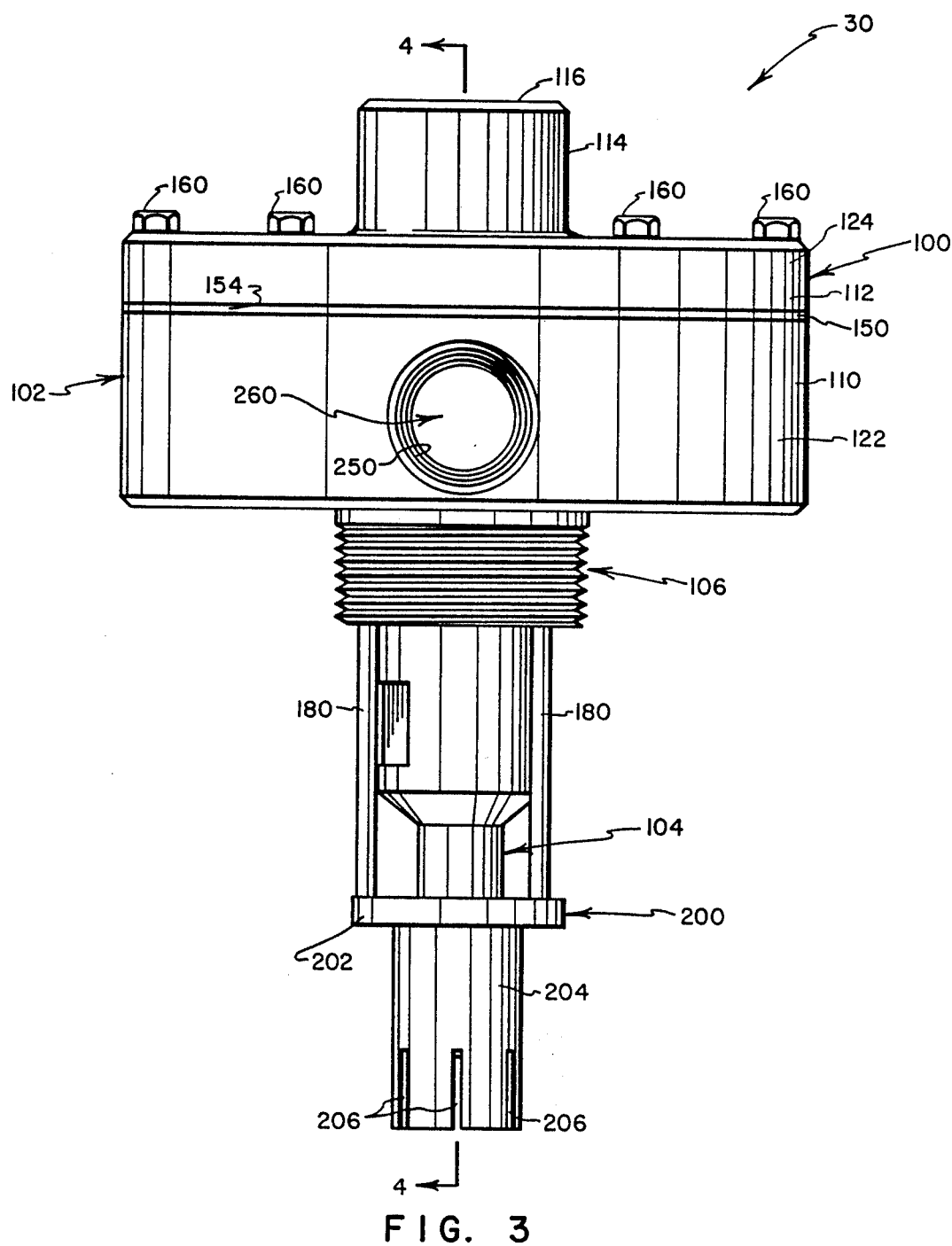
FIG. 3 is a side ele ational view thereof, with valving components thereof closed.

The cap member 112 has an upwardly projecting hollow portion 114 that terminates in a circular end wall 116. A compression coil spring 160 is carried within the upper portion 134 of the chamber 130. The spring 160 has an upper end 162 that engages the end wall 116 of the cap portion 112. A lower end 164 of the spring 160 engages a circular plate 170 that overlies the central portions 152 of the membrane 150. The spring 160 biases central portions 152 of the membrane 150 downwardly toward a "valve closed" position that is shown in FIGS. 2, 3 and 4. By causing the spring 160 to be compressed, the membrane 150 can arch upwardly to a "valve open" position that is depicted in FIG. 5.

A vent opening 168 is provided through the upstanding part 114 of the cap portion 112 to vent the upper chamber portion 134 to atmosphere, whereby the pressure force of ambient air is caused to be applied to the upper face of the membrane 150.

Referring to FIGS. 2-5, the base member 110 has three ducts or passages 190 that extend through the threaded portion 106 and serve to communicate the lower portion 132 of the chamber 130 with the supply line 10, thereby admitting supply line pressure (i.e., combustion air flow pressure) to the lower chamber portion 132 to act on the membrane 150. Three elongate rods 180 extend alongside the tubular portion 10 of the body 100 and through the ducts or passages 190. At their upper ends the rods 180 connect with the circular plate 170 (see FIGS. 4 and 5 wherein one of he rods 180 and its connection to the plate 170 are shown) and with the central portions 152 of the mem rane 150 for movement with the central portions 152 of the membrane 150. At their lower ends the rods 180 connect with a sleeve-like valving member 200. The rods 180 cause the sleeve-like valving member 200 to move axially alon. the tubular portion 104 of the base member 102 of the body 100 in response to corresponding upward and downward movements of central portions 152 of the membrane 150 in the chamber 130.

Referring to FIGS. 2-5, the sleeve-like valving member 200 has an enlarged diameter portion 202 at its upper end region that connects with the rods 180, a tubular central body portion 204, and a plurality of slots or grooves 206 that are arranged in a radial array in the walls of the lower end region of the tubular body 204. A central passage 208 of uniform diameter is formed axially through the valving member 200, and has a diameter that slip fits about a pair of enlarged diameter ring-like formations 210 that are provided at spaced locations on the tubular body member 204 near the lower end region thereof. A reduced diameter portion 220 of the tubular body portion 204 extends between and connects the ring-like formations 210. The ring-like formations 210 are located at vertically spaced positions, and define opposite ends of an annular chamber 230 that extends about the tubular portion 204 of the base member 110 of the body 100. The central passage 208 of the sleeve-like valving member 200 is slip-fitted about the ring-like formations 210 so as to be axially movable along the tubular portion 204. The central passage 208 of the sleeve-like valving member defines the outer diameter of the annular chamber 230.

Referring to FIGS. 4 and 5, the base member 110 of the body 100 has a threaded opening 250 for receiving the oxygen supply line 50. A passage 260 is formed through the base member 110 for communicating the threaded opening 250 with the annular chamber 230 that extends about the lower end region of the tubular body portion 104. The passage 260 has a horizontally extending portion 262 that extends radially inwardly from the opening 250, and a vertically extending portion 264 that connects with the portion 262 and extends downwardly to a location near the lower end of tne tubular body portion 104 wherein a passage 266 extend in opposed directions to provide openings 268 that are formed through opposite sides of the reduced diameter wall portion 220 that extends about the tubular body portion 104 at a location between the ring-like formations 210. The passage 260 thus serves to duct oxygen from the supply line 50 to the annular chamber 230 that is defined between the central passage 208 of the sleeve-like valving member 200 and the reduced diameter portion wall 220 at a location between the two ring-like formations 210.

When the sleeve-like valving member 200 is moved upwardly along the tubular body portion 104 from the "valve closed" position of FIGS. 2, 3 and 4 toward the "fully open" position of FIG. 5, communication is established through the grooves 206 between the annular chamber 230 and the combustion air supply line 10, whereby oxygen is permitted to discharge through the grooves 206 into the supply line 10. The positioning of the grooves 206 of the sleeve-like valving member 200 at substantially the center of the cross-sectional area of the supply line 10 enables the radial flows of oxygen 32 that discharge through the grooves 206 to mix in a desirable manner with the flow 22 of combustion air through the supply line 10. The higher the sleeve-like valving member 200 is raised, the larger will be the total cross section of the openings that are provided by the grooves 206 for discharging oxygen into the supply line 10.

When the combustion air 12 passes through the supply line 10, its flow is regulated by the damper 20, and the regulated flow 22 will enter the lower chamber portion 132 through the ducts of passages 190 that also house the rods 180. The presence of combustion air supply pressure in the lower chamber portion 132 operates on the membrane 150 to press the membrane 150 upwardly. Upward movement of the membrane 150 under the influence of the pressure force of the combustion air supply pressure acting on the lower surface of the membrane 150 will be accompanied by upward movement of the rods 180, and likewise by corresponding upward movement of the sleeve-like valving member 200. Upward movement of the membrane 150 compresses the spring 160 until a state of equilibrium prevails among pressure force that is applied on the membrane 150 by combustion air flow pressure in the lower chamber portion 132, the force of the spring 160, and the pressure force that is applied to the membrane 150 by ambient air that is vented into the upper chamber portion by the vent passage 168. Upward movement of the sleeve-like valving member 200 permits oxygen to flow from the passage 260 through the annular chamber 230 and through the grooves 206 into the combustion air supply line 10.

In preferred practice, the area of the grooves 206 and the openings 268, as well as the area of the membrane 150 and magnitude of the force of the spring 160 are so dimensioned (i.e., "selected") that oxygen flow from the valve 30 is proportioned at a desired ratio to the flow of combustion air 22 though the supply line 10. Stated in another way, the mixing valve 30 depends on the design of its components for the character of the ratio of oxygen to combustion air that it brings to the above-described system.

In the event that combustion air flow 22 is decreased in the supply line 10, the pressure exerted by the combustion air flow 22 on membrane 150 drops, and the sleeve-like valving member 200 is caused to move downwardly with the rods 180 and the membrane 150, whereby the flow of oxygen flow 32 that is discharged into the combustion air supply line 10 is diminished. In this manner, the mixing valve 30 functions to adjust the rate of flow at which oxygen is introduced into the combustion air flow 22 that travels through the supply line 10 so that the ratio of oxygen and combustion air that is in the mixed gas flow 42 remains substantially constant.

The combustion air flow 22 that is ducted through the supply line 10 for delivery to a burner (not shown) or the like typically is regulated by the damper 20 or by other controls (not shown) within a range of about 25–100 per cent of its maximum flow. The mixing valve 30 is designed such that proportionality between combustion air and oxygen gas content in the mixed gas flow 42 is maintained within this regulation range.

In designing components for use with the valve assembly 30, it should be kept in mind that the maximum flow of oxygen that is had through the valve 30 can be regulated to a certain extent by means of the pressure regulator 56, which gives a limited range of adjustment to the ratio of oxygen to combustion air that is provided by the valve 30. It is the relative dimensioning of the components of the valve 30, however, including the force of the spring 160, the area of tne membrane 150, the combined area of the openings 268 in the oxygen gas passage 260, and the dimensions of the annular chamber 230 and of the grooves 206 that determine the ratio that is characteristic of the valve 30 in delivering oxygen into the combustion air flow 22. Maximum oxygen flow through the valve 30 is had by setting the combined sizes of the openings 268 to equal the size or the cross sectional area of the passage portions 262, 264, and by sizing the effective openings provided by the slots 206 to likewise equal the cross sectional areas of the passage portions 262, 264. In normal practice, the sum of the areas for the grooves 206 lies in the range of 40–80 per cent of the cross-sectional areas of the passage portions 262, 264 when the valve 30 is fully open.

As will be apparent from the foregoing description, the sleeve-like valving element 200 is not tightly fitted about the ring-like formations 210 of the body, which is to say that the valve 30 itself cannot be fully closed. Thus the oxygen gas flow through the valve 30 is shut off, when appropriate, by operation of the valve 54 which is actuated by the signal 62 from the pressure monitor 60 which senses when combustion air flow 22 ceases in the supply line 10.

Figure 6:
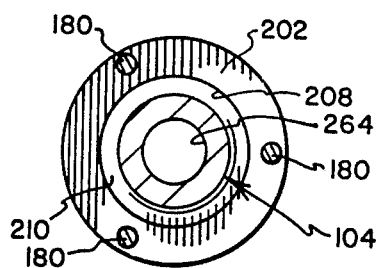
FIGS. 6, 7 and 8 are sectional views as seen from planes indicated by lines 6—6, 7—7 and 8—8, respectively, in FIG. 4; and, FIG. 9 is a sectional view as seen from planes indicated by a broken line 9—9 in FIG. 5.
Figure 7:
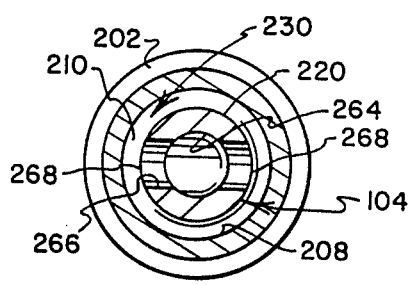
Figure 8:
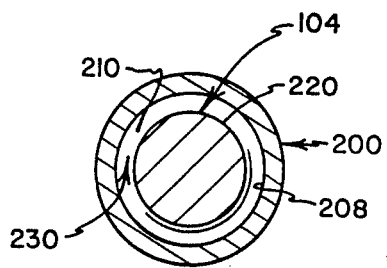
Figure 9:
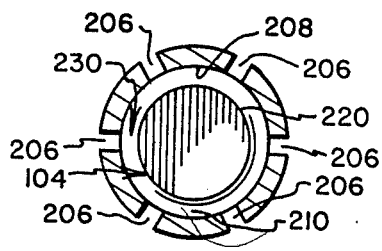

While the somewhat schematic cross-sectional views of FIGS. 4 and 5 show the use of only one of the rods 180, it will be understood that, in preferred practice, three rods 180 are used as is depicted in FIGS. 2, 3 and 6 in order for a symmetrical lifting movement to be obtained.

Such tests as have been carried out with the above-described system have show the resulting oxygen-enriched combustion air flow (at it has been analyzed at different flow settings) to be constant.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A valve device for enrichment of a flow of a first gas such as a combustion gas with a flow of a second gas such as oxygen, wherein the valve device comprises:
   (a) body means for connection to a supply line that carries a flow of the first gas, and having an elongate tubular portion for extending centrally into the supply line to define a dispensing location for a second gas near the center of the supply line;
   (b) the body means having structure that defines a chamber that is divided into a first portion and a second portion by a membrane that is clamped by the body means so as to extend across the chamber, with the membrane providing a gas-tight seal between the first portion and the second portion to prevent the flow of gases between the first and second portions of the chamber, and with at least a portion of the membrane being movable within the chamber relative to the body means in first and second opposed directions of movement;
   (c) biasing means including a spring member carried in a selected one of the first and second portions of the chamber for biasing the membrane in said first direction of movement;
   (d) at least one elongate rod-shaped member connecting with the movable port on of the membrane and being movable therewith relative to the body means in said first and second directions of movement, and being biased by the action of the biasing means in said first direction of movement;
   (e) duct means defined by the body means for communicating the second portion of the chamber with the supply line for admitting supply line pressure to the second portion of the chamber to act on the membrane to bias the movable portion of the membrane in said second direction of movement, said duct means also serving to support the rod-shaped member for movement therethrough relative to the body means in said first and second directions of movement;
   (f) passage means defined by the body means for connection with a source of the second gas and for ducting said flow of the second gas through the tubular portion of the body to the dispensing location;
   (g) valving means carried by the tubular portion of the body for defining valve discharge opening means at the dispensing location including a valving member that is movable to selectively open and close the discharge opening means for selectively opening and closing to provide a desired flow of the second gas from the passage means into a flow of the first gas within the supply line, the valving member being connected to the rod-shaped member and being operable in response to movement of the rod-shaped member to open and close the discharge opening means to permit the prevent the passage of the second gas into the flow of the first gas, the valving means having:
      (i) discharge opening means that is formed on a tubular portion of the body means and is positioned by the body means at a location that is substantially central with respect to the cross-section of the supply line that carries the flow of the first gas;
      (ii) sleeve means for defining the movable valving member and for extending about the tubular portion of the body means for movement axially along the tubular portion of the body means to selectively open and close the discharge opening means to permit and prevent the second gas to discharge from the discharge opening means into the flow of the first gas; and,
      (iii) the sleeve means being connected to the rod-shaped member for movement therewith to a closed position to close the discharge opening means in response to movement of the rod-shaped member in said first direction, and to an open position to open the discharge opening means in response to movement of the rod-shaped member in said second direction.

2. The valve device of claim 1 additionally including vent means defined by the body means for communicating the first portion of the chamber with ambient air for admitting ambient air pressure to the first portion of the chamber to act on one side of the membrane to bias the movable portion of the membrane in said first direction of movement.

3. The valve device of claim 1 wherein the sleeve means has a plurality of grooves formed therein and extending axially therealong, with the grooves being brought into communication with the discharge opening means when the sleeve means is moved from said closed position to said open position.

4. The valve device of claim 3 characterized in that the area of the membrane, the force of the spring member, the area of the discharge opening means, and the combined areas of the grooves formed in the sleeve means are configured such that the ratio between the amount of second gas that is introduced by the valve device into the flow of the first gas remains substantially constant independently of the pressure within the supply line.

5. The valve device of claim 4 characterized in that the sum of the areas for the discharge opening means and the grooves is equal to the cross-sectional area of the passage means for the second gas, and in that the sum of the areas of the grooves lies within the range of about 40 to 80 per cent of the cross-sectional area of the passage means for the second gas when the valve is fully open.

6. A mixing valve having body means adapted to extend through a hole formed in a sidewall of a supply line through which combustion air is ducted under pressure to a burner for providing an injection location for introducing oxygen into the flow of combustion air at a position that is within the central part of a flow path followed by the combustion air as the combustion air is ducted through the supply line, with the mixing valve serving to regulate the introduction of oxygen into the flow of combustion air in accordance with the flow rate of the combustion air through the supply line as the rate of flow of combustion air is sensed at the location of the mixing valve, and wherein:
  (a) the body means has portions that extend externally of the combustion air supply line for defining a chamber having a membrane extending therethrough for dividing the chamber into first and second segragated portions;
  (b) oxygen delivery means including passage means formed in the body means for connection to a source of pressurized oxygen for ducting oxygen to the injection location, and valve components including discharge means defining a discharge opening, and valving element means that is movable relative to the discharge means for regulating the flow of oxygen from the discharge means, the valve components being carried by a portion of the body means which projects centrally into the combustion air supply line for dispensing oxygen centrally into the flow of combustion air at the injection location;
  (c) rod-shaped connection means for connecting the valving element and being operable to effect closing and opening movements of the valving element in response to movement of the membrane within the chamber in first and second opposed directions, respectively, to cause corresponding opening and closing movements of valve components;
  (d) the body having a vent passage for venting one of the segregated chamber portions to the atmosphere thereby exposing one of the sides of the membrane to the pressure of ambient air;
  (e) the body having at least one duct formed therein for communicating the other of the segregated chamber portions with the combustion air supply line, thereby exposing the opposite side of the membrane to the pressure of the combustion air flow;
  (f) a compression coil spring housed within said one of the segregated chamber portions for cooperating with atmospheric pressure to bias the membrane in opposition to the action of the supply line pressure on the membrane;
  (g) the rod-shaped connection means extending into said other segregated chamber portion and through the duct; and being slidably movable in the duct;
  (h) the valving element means including discharge formation means carried on the body means, passage means formed through the body means for ducting a flow of oxygen from a source of pressurized oxygen to the injection location, and sleeve-like valving member means that is movable supported on the body for cooperating with the formation means to effect a controlled discharge of oxygen into the flow of combustion air, with the sleeve-like valving member means being connected to the rod-shaped means for movement relative to the body means between closed and open positions in response to movement of the membrane in the chamber;
  (i) the configuration and dimensioning of the aforedescribed components of the valve device being selected as to provide a desired ratio of introduction of oxygen to the rate of flow of combustion air so that a substantially constant ratio of oxygen to combustion air is maintaing in the resulting flow of mixed gases; and,
  (j) whereby, if the membrane should rupture, air that acts on one side of the membrane would be permitted to mix with air the acts on the other side of the membrane, but oxygen flow would be cut off by the action of the compression coil spring seating the valving elements that control the dispensing of oxygen into the flow of combustion air.

7. The valve device of claim 6 wherein the sleeve-like structure circumferentially surrounds the body portion that projects into the combustion air supply line for ducting oxygen to the injection location, and the sleeve-like structure cooperates with the discharge means to effect a controlled flow dispensing of oxgen into the flow of combustion air in response to positioning of the membrane in the chamber as an function of the pressure of the supply line combustion air flow.

8. A proportional mixing valve for installation on a combustion air supply line for introducing a controlled flow of oxygen into a flow of combustion air, with the delivery of the oxygen into the combustion air being effected so as to maintain a relatively constant ratio of these gases in the resultant flow of mixed gases, wherein the mixing valve comprises:
  (a) body means for defining a chamber with membrane means extending through the chamber for dividing the chamber into separate first and second, gas-segregated portions;
  (b) spring member means provided on one side of the membrane and being housed within the first of the separate chamber portions, said first chamber portion also being vented to the atmosphere to admit ambient air so that the pressure of the ambient air will act on said one side of the membrane;
  (c) elongate rod-shaped means provided on the other side of the membrane for extending through duct means that is defined by the body means for communicating the second of the separate chamber portions with the flow of combustion air to admit combustion air to the second chamber portion so that the pressure of the flow of combustion air will act on said other side of the membrane, the duct means further serving to slidably support the elongate rod-shaped means for movement relative to the body means;
  (d) valving element means carried by the body means at a location that is substantially central to the flow of combustion air, with the valving element means including discharge formation means carried on the body means, passage means formed through the body means for ducting a flow of oxygen from a source of pressurized oxygen to the injection location, and sleeve-like valving member means that is movably supported on the body for cooperating with the formation means to effect a controlled discharge of oxygen into the flow of combustion air, with the sleeve-like valving member means being connected to the rod-shaped means for movement relative to the body means between closed and open positions in response to movement of the diaphragm in the chamber in said first and second directions, respectfully; and, (e) the configuration and dimensioning of the afore-described components of the valve device being selected as to provide a desired ratio of introduction of oxygen to the rate of flow of combustion air so that a substantially constant ratio of oxygen to combustion air is maintained in the resulting flow of mixed gases.

9. The proportional mixing device of claim 8 wherein the sleeve-like valving member has a plurality of grooves formed therein that are brought into alignment with the formation means when the proportional mixing device is in its open position to deliver oxygen into the central portions of the flow of combustion air in a plurality of flows that promote efficient mixing of the oxygen with the flow of combustion air.

10. The proportional mixing device of claim 9 wherein the plurality of grooves extend substantially radially with respect to a central axis of the sleeve-like valving member whereby a highly desirable type of mixing of the oxygen with the flow of combustion is caused to take place as the oxygen discharged into the flow of combustion air mixes therewith.

* * * * *